United States Patent
Wang et al.

(10) Patent No.: US 10,984,607 B1
(45) Date of Patent: Apr. 20, 2021

(54) DISPLAYING 3D CONTENT SHARED FROM OTHER DEVICES

(71) Applicant: Apple Inc., Cupertino, CA (US)

(72) Inventors: Norman N. Wang, Sarasota, CA (US); Wei Lun Huang, Sunnyvale, CA (US); David Lui, Sunnyvale, CA (US); Tyler L. Casella, San Mateo, CA (US); Ross R. Dexter, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/367,524

(22) Filed: Mar. 28, 2019

Related U.S. Application Data

(60) Provisional application No. 62/649,907, filed on Mar. 29, 2018.

(51) Int. Cl.
| | | |
|---|---|---|
| *G06T 19/20* | (2011.01) | |
| *G06T 19/00* | (2011.01) | |
| *G06F 1/16* | (2006.01) | |

(52) U.S. Cl.
CPC ............ *G06T 19/20* (2013.01); *G06F 1/1694* (2013.01); *G06T 19/003* (2013.01); *G06T 2219/024* (2013.01)

(58) Field of Classification Search
CPC . G06T 19/20; G06T 2219/024; G06T 19/003; G06F 1/1694
See application file for complete search history.

(56) References Cited

U.S. PATENT DOCUMENTS

| | | | | |
|---|---|---|---|---|
| 2013/0042296 | A1* | 2/2013 | Hastings | G06F 21/10 726/1 |
| 2013/0151981 | A1* | 6/2013 | Green | G06F 3/0484 715/744 |
| 2016/0148433 | A1* | 5/2016 | Petrovskaya | G02B 27/01 345/633 |
| 2016/0203648 | A1* | 7/2016 | Bilbrey | H04N 5/272 348/333.02 |
| 2016/0253844 | A1* | 9/2016 | Petrovskaya | G06Q 50/01 345/633 |
| 2017/0366520 | A1* | 12/2017 | Templin | H04L 9/3268 |
| 2018/0144556 | A1* | 5/2018 | Champion | G06F 3/0346 |

OTHER PUBLICATIONS

Nuernberger, B. et al., "Snap to Reality: Aligning Augmented Reality to the Real World", Augmented AR and VR Experiences, CHI '16, San Jose, CA, pp. 1233-1244, May 2016 (Year: 2016).*

* cited by examiner

*Primary Examiner* — Michael Le
(74) *Attorney, Agent, or Firm* — Thompson Hine LLP

(57) ABSTRACT

One exemplary implementation involves performing operations at a device with one or more processors, a camera, and a computer-readable storage medium, such as a desktop computer, laptop computer, tablet, or mobile phone. The device receives a data object corresponding to three dimensional (3D) content from a separate device. The device receives input corresponding to a user selection to view the 3D content in a computer generated reality (CGR) environment, and in response, displays the CGR environment at the device. To display the CGR environment the device uses the camera to capture images and constructs the CGR environment using the data object and the captured images.

20 Claims, 8 Drawing Sheets

DISPLAYING 3D CONTENT SHARED FROM OTHER DEVICES

CROSS-REFERENCE TO RELATED APPLICATION

This application claims the benefit of U.S. Provisional Application Ser. No. 62/649,907 filed Mar. 29, 2018, which is incorporated herein in its entirety.

TECHNICAL FIELD

The present disclosure generally relates to three dimensional (3D) content, and in particular, to systems, methods, and devices for sharing and displaying 3D content as part of computer generated reality (CGR) environments.

BACKGROUND

Existing computing systems and applications do not adequately facilitate the sharing and use of 3D content to provide and use CGR environments on electronic devices.

SUMMARY

Various implementations disclosed herein include devices, systems, and methods that display CGR environments using 3D content shared from other devices. Some implementations involve performing operations at a device with one or more processors, a camera, and a computer-readable storage medium. The device receives a data object corresponding to three dimensional (3D) content from a separate device. The device receives input corresponding to a user selection to view the 3D content in a CGR environment, and in response, displays the CGR environment at the device. To display the CGR environment, the device uses the camera to capture images and constructs the CGR environment using the data object and the captured images. The user of the device is thus able to simply and easily receive, view, and use 3D content in a CGR environment without necessarily needing to move the 3D content to a particular storage location on the device, identify that the received data object has 3D content that can be experienced in a CGR environment, identify an app to provide the CGR experience, launch such an app, or import or add the received 3D content to the CGR environment provided by such an app. The user experience is a more efficient, effective, and intuitive.

The devices, systems, and methods disclosed herein enable the display of 3D content corresponding to received data objects in CGR environments based on user input. The devices, systems, and methods improve the ability of users to share 3D content to be experienced in CGR environments. For example, a first user, who is at home using a first device, can receive a data object corresponding to a couch from a second user who is in a retailer store looking at the couch. In this example, the second user uses a second device to create or identify a data object corresponding to the couch, e.g., using a camera of the second device to create a file that includes a 3D model of the couch or identifying a file or data storage address of a file that includes a 3D model of the couch. The second user then uses the second device to send a communication to the first user that includes or provides access to the data object. As examples, the second device can send a text message with the data object (e.g., file) attached, an e-mail message with the data object attached, or any other form of message attaching or providing a link or data storage address to obtain the data object.

Based on receiving the communication from the second device, the first device enables viewing or use of the data object. The first device receives input corresponding to a first user selection to view the content corresponding to the data object in a CGR environment. As examples, the first user may have clicked, double clicked, or tapped on a thumbnail image, link, icon, or button representing the data object within a text dialog window, an e-mail message viewer, or a social media message viewing website. Responsive to detecting this input, the first device displays a CGR environment by using the camera to capture images (e.g., video) and constructing the CGR environment using the data object and the captured images. In some implementations, the first device overlays the 3D content corresponding to the data object on the captured images. In some implementations, the first device automatically detects a file type of the data object and, based on the detected file type, identifies and launches a viewer to provide the CGR environment, including the 3D content corresponding to the data object. In some implementations, the first device accesses a plugin to launch the viewer within the user interface of the same app in which the thumbnail image, link, icon, or button representing the data object was displayed.

In some implementations, the CGR environment is configured to respond to user input interacting with the additional content or changing the user's viewpoint. For example, the first user may reposition the couch relative to the real world tables in the captured images and then physically move the device around the room to view the couch from different viewpoints within the room.

In accordance with some implementations, a device includes one or more processors, a non-transitory memory, and one or more programs; the one or more programs are stored in the non-transitory memory and configured to be executed by the one or more processors and the one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
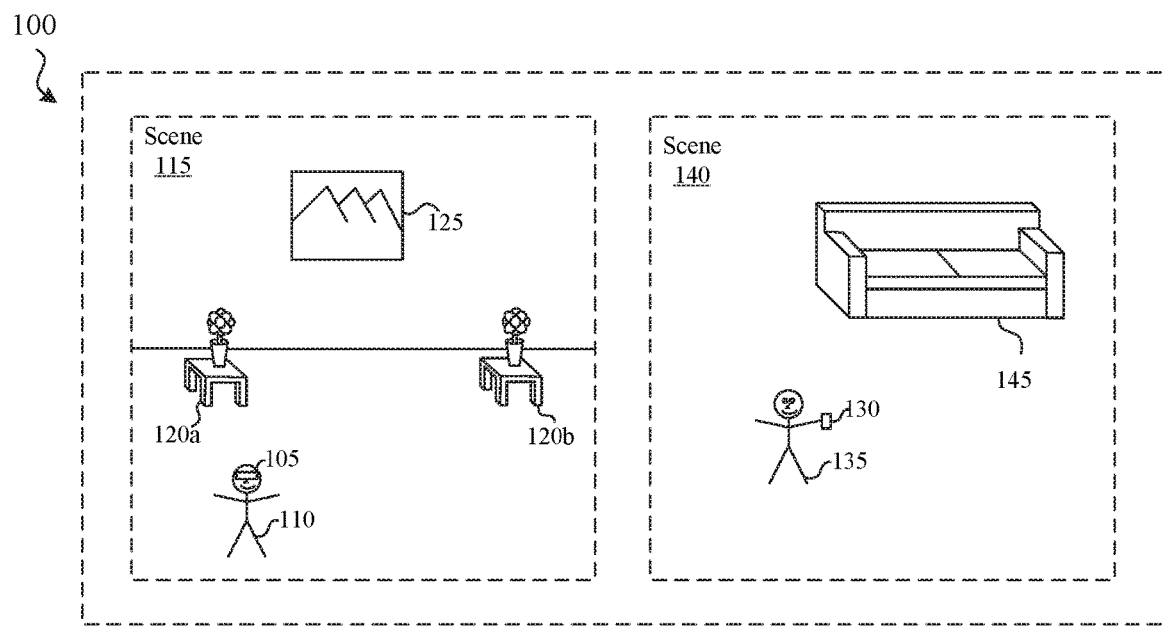
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

As used herein, the phrase "physical environment" refers to a physical world that people can sense or interact with without aid of electronic systems. Physical environments, such as a physical park, include physical articles, such as physical trees, physical buildings, and physical people. People can directly sense or interact with the physical environment, such as through sight, touch, hearing, taste, and smell.

As used herein, the phrase "computer-generated reality" refers to a wholly or partially simulated environment that people sense or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense or interact with a CGR object using any one of their senses, including sight, sound, touch, taste, and smell. For example, a person may sense or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense or interact only with audio objects.

Examples of CGR include virtual reality and mixed reality. A virtual reality (VR) environment refers to a simulated environment that is designed to be based entirely on computer-generated sensory inputs for one or more senses. A VR environment comprises a plurality of virtual objects with which a person may sense or interact. For example, computer-generated imagery of trees, buildings, and avatars representing people are examples of virtual objects. A person may sense or interact with virtual objects in the VR environment through a simulation of the person's presence within the computer-generated environment, or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality. An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Referring to FIG. 1, an example operating environment 100 for implementing aspects of the present invention is illustrated. In general, operating environment 100 represents two devices 105, 130 involved in the sharing of a data object representing 3D content for display as part of a CGR experience. As depicted in the example of FIG. 1, the operating environment 100 includes a first device 105 being used by a first user 110 in a physical environment (first real world scene 115) and a second device 130 being used by a second user 135 in a physical environment (second real world scene 140). In this example, the first real world scene 115 includes end tables 120a, 120b and wall picture 125. The second real world scene 140 includes a sofa 145. In the example illustrated in FIG. 1, the first real world scene 115 and the second real world scene 140 are separate from one. However, the devices, systems, and methods described herein can be practiced in circumstances in which the real world scenes 115, 140 are the same or in which some or all of the real world objects are in both of the scenes 115, 140. Moreover, the devices, systems, and methods can involve the second user 135 sharing data objects that are unrelated to the second real world scene 140 in which the second user 135 is located. For example, the second user 135 could create a virtual object on the second device 130 using a computer-aid design (CAD) software application and send a corresponding data object to the first device 110 for viewing and use.

In the example of FIG. 1, the second user 135 observes the couch 145 in the second real world scene 140 and would like to know if the couch would be a good (e.g., aesthetically pleasing) match with the real world objects in the first real world scene 115. For example, the second user 135 may be walking through through a retail furniture store looking at multiple couches and find couch 145. The devices, systems, and methods enable the second user 140 to send a data object corresponding to three dimensional (3D) content representing the couch 145 to the first device 105, and enable the first user 110 to receive the data object, provide input (e.g., a click on an icon representing the data object), and then experience a CGR environment that combines the real world (e.g., via locally captured images of the first real world scene 115) and the 3D content corresponding to the data object (e.g., an image based on the 3D appearance of the couch).

In some implementations, the second device 130 creates or stores the data object corresponding to the couch that will be provided to the first device 105. The second device 130 may include one or more cameras that capture images of the second real world scene 140 and the second device may be configured to generate a 3D model of the desired 3D content based on the captured images. In some implementations, the second device generates a model of multiple objects (or all objects) within the second real world scene 140 and the second user 135 provides input to individually select one or more of those objects to be individually stored as data objects and shared with one or more other users or user devices.

Figure 2:
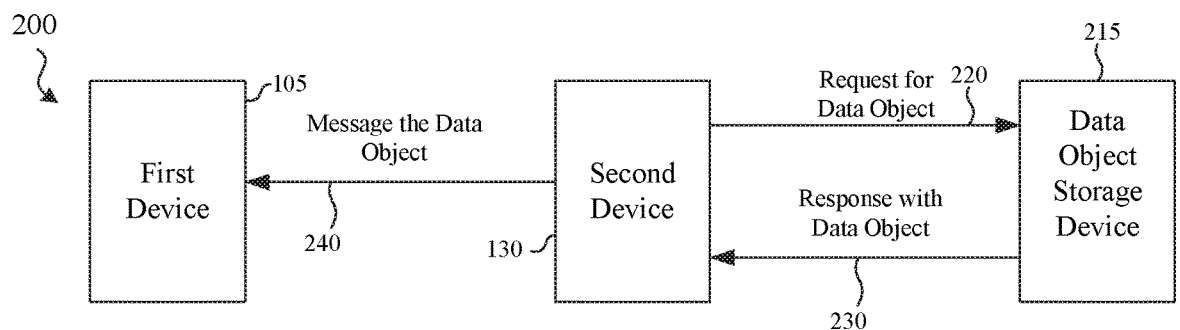
FIG. 2 is a flow chart illustrating a flow of communications involved in sharing a data object according to some implementations.
Figure 3:
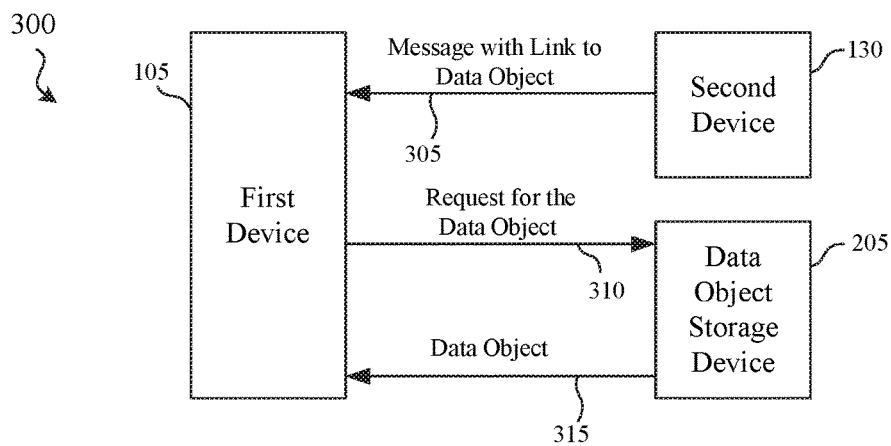
FIG. 3 is a flow chart illustrating an alternative flow of communications involved in sharing a data object according to some implementations.

In some implementations, the second device 130 obtains the data object corresponding to the couch that will be provided to the first device 105. The data object may be obtained from a separate data object storage device. FIGS. 2 and 3 illustrate exemplary techniques for sharing a data object that is stored at a separate data object storage device.

FIG. 2 is a flow chart illustrating a flow of communications 200 involved in sharing a data object according to some implementations. In FIG. 2, the second device 130 obtains a data object by sending a request 220 for the data object to a data object storage device 215 and receiving a response 230 that includes the data object. The second device 130 then uses the received data object to send a message 240 to the first device 105. In some implementations, the second device 130 identifies which data object to request based on information in the first real world scene 140. For example, a camera on the second device 130 can capture one or more images of the couch 145 and a data object can be identified by matching the captured image or images with a corresponding 3D model of the couch in a database of 3D models of couches maintained at the data object storage device 215. Alternative or additional information can be used to identify the data object including, but not limited to, information from bar codes on or near the couch 145, RFID tags on or near the couch 145, user entered object identification data, or location data (e.g., identifying the store, row, floorplan position, etc. based on device on GPS, NFC-based tracking, or other location detection technology).

FIG. 3 is a flow chart illustrating an alternative flow of communications 300 involved in sharing a data object according to some implementations. In FIG. 3, the second device 130 identifies a data object corresponding to the couch, for example, using one or more of the techniques discussed with reference to FIG. 2. The second device identifies a storage location of the data object and identifies a link that provides access to the data object at the storage location. The second device 130 then sends a message 305 with the link to the data object to the first device 105. Based on user input accessing the data object on the first device 105, the first device 105 uses the link to send a request 310 for the data object to the data object storage device 205. The data object storage device 205 responds by providing the data object 315 corresponding to the couch.

Figure 4:
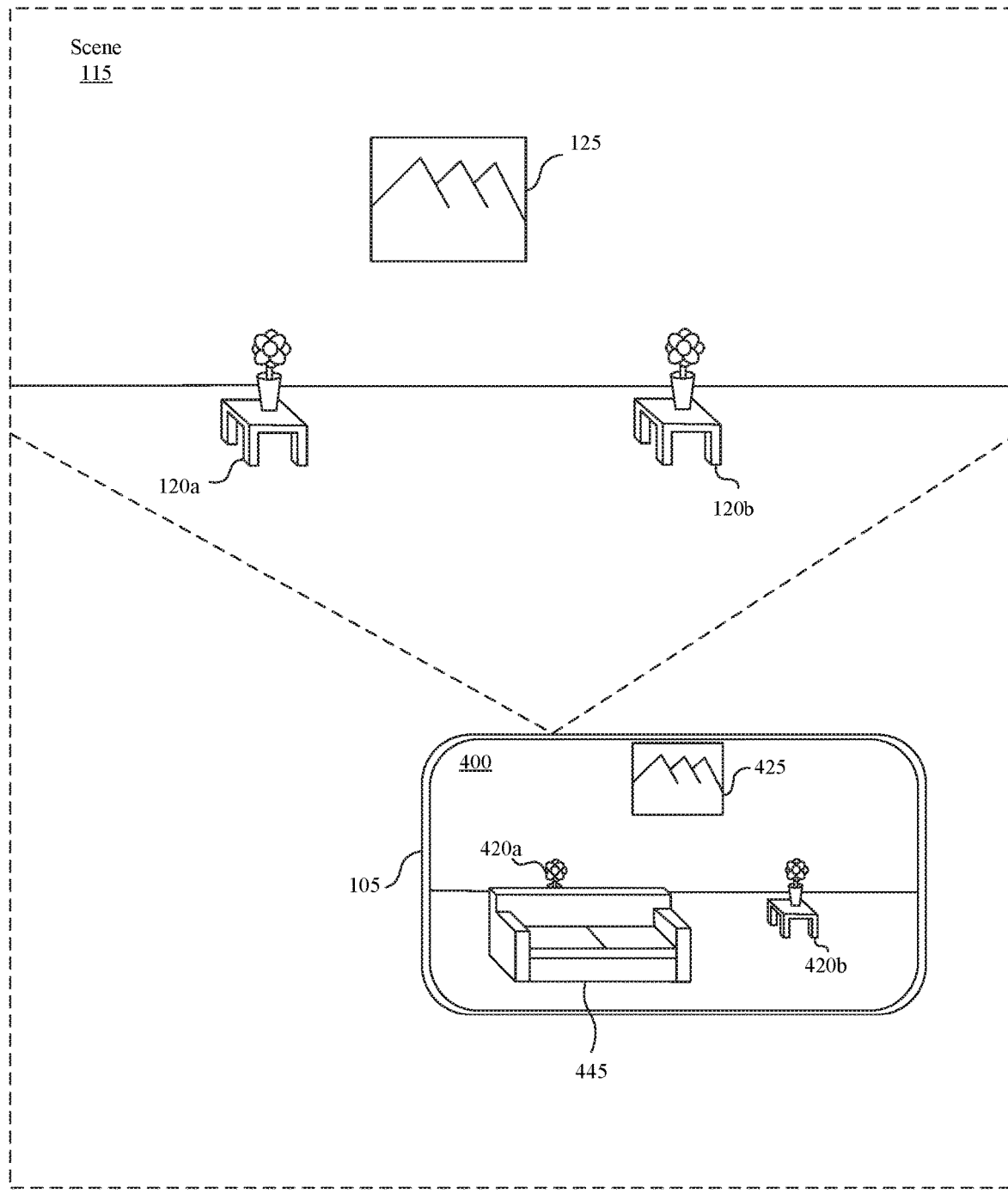
FIG. 4 illustrates a CGR environment provided on the first device of FIG. 1 using a received data object according to some implementations.

FIG. 4 illustrates a CGR environment 400 being provided on the first device 105 in the first real world scene 115 of the environment 100 of FIG. 1. In this example the first device 105 has received the data object corresponding to the couch (i.e., couch 145 of FIG. 1). The first device 105 may have presented a representation of the content of the received data object such as a thumbnail image, icon, link, or button representing or corresponding to the received data object. In the case of an icon or thumbnail image, for example, the icon or thumbnail image may include a two dimensional (2D) image of the content of the 3D object from a single or standard viewpoint. Thumbnail images, icons, links, and buttons are examples of graphical features that can received input (e.g., clicks, touches, etc.) corresponding to a user selection to view the 3D content in a CGR environment. For example, the first user could provide input selecting to view the 3D content of the couch in a CGR environment by clicking on a thumbnail image corresponding to the data object.

Responsive to detecting input, the first device 105 displays a CGR environment 400. To display the CGR environment 400, the first device 105 controls one or more cameras on the first device 105 to capture images of the first real world scene 105 and constructs the CGR environment 400 using the data object and the captured images. In some implementations, the first device 105 includes a suitable combination of software, firmware, or hardware to provide the CGR experience to the first user 110. In other implementations, the first device 105 interacts with one or more other device (local or remote) to provide the CGR environment 400, e.g., the first device 105 may communicate with a separate controller device (not shown) that performs some or all of the processing and storage required to provide the CGR environment 400. According to some implementations, the first device 105 presents the CGR environment 400 to the first user 110 while the first user 110 is physically present within the first real world scene 105. In some implementations, the first device 105 is configured to provide the CGR environment 400 using optical see-through of the first real world scene 115. In some implementations, the first device 105 is configured to provide the CGR environment 400 using video pass-through of the first real world scene 115.

In some implementations, the first device 105 is a head-mounted device (HMD) that the first user 110 wears. An HMD may enclose the field-of-view of the first user 110. The HMD includes one or more CGR screens or other displays configured to display the CGR environment 400. In some implementations, an HMD includes a screen or other display to display the CGR environment 400 in a field-of-view of the first user 110. In some implementations, the HMD is worn is a way that a screen is positioned to display the CGR environment 400 in a field-of-view of the first user 110. In some implementations, the first device 105 is a handheld electronic device (e.g., a smartphone or a tablet) configured to present the CGR environment 400 to the first user 110. In some implementations, the first device 105 is a CGR chamber, enclosure, or room configured to present an CGR environment in which the first user 110 does not wear or hold the first device 105.

The first device 105 is configured to use images or other real world information detected based on a camera or other sensor on the first device 105. In some implementations, to provide the CGR environment 400, the first device 105 uses at least a portion of one or more camera images captured by a camera. In the example of FIG. 4, the CGR environment 400 includes depictions of items captured by a camera of the first device 105. The CGR environment 400 depicts a wall picture 425 corresponding to wall picture 125, a portion an end table 420a corresponding to a portion of end table 120a, i.e., only a portion of a flower on a vase in the end table 120a is visible, and end table 420b corresponding to end table 120b. The CGR environment 400 also depicts couch 445 corresponding to the data object and thus to the couch 145 in the second real world scene 140 (FIG. 1).

In some implementations, the first device 105 enables the first user 110 to change the viewpoint or otherwise modify or interact with the CGR environment 400. In some implementations, a first device 105 is configured to receive user input that repositions received 3D content such as the couch 445 relative to the real world items depictions (e.g., wall picture 425, end tables 420a, 420 b) depicted in the CGR environment 400.

Figure 5:
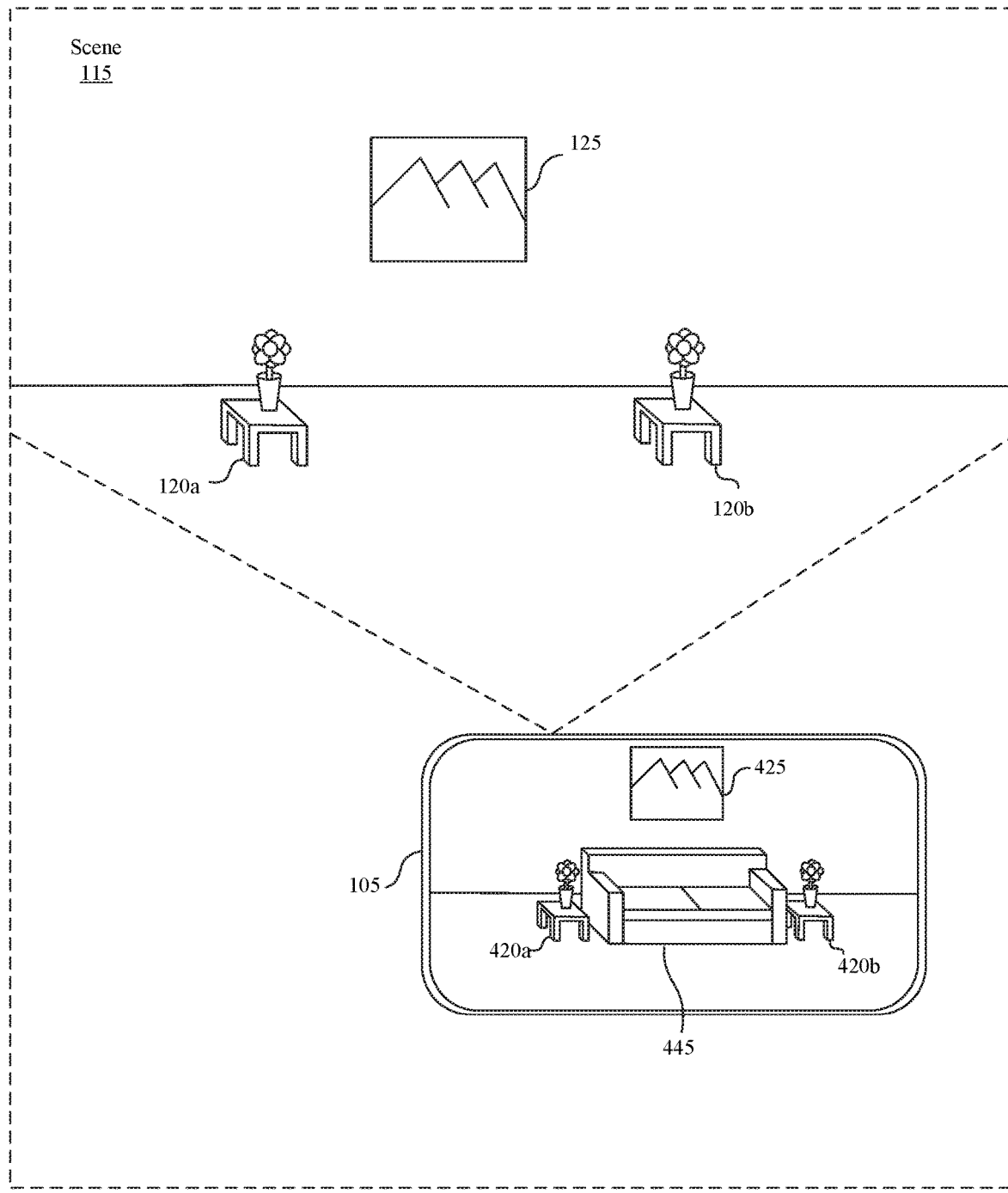
FIG. 5 illustrates a CGR environment of FIG. 4 after being modified based on user input according to some implementations.

FIG. 5 illustrates the CGR environment 400 of FIG. 4 after being modified based on user input. For example, the first user 110 may have provided touch input on a screen of device 105 to drag the depiction of the couch 445 in between the depictions of the end tables 420a, 420b. Similarly, the first user 110 may have provided input to rotate, resize, or otherwise modify the depiction of the couch 445 relative to the depictions of the end tables 420a, 420b.

The positional relationship between received 3D object, such as the depiction of the couch 445, and real world objects, such as the end tables 420a, 420b, can be maintained as the viewpoint used to provide a view of the CGR environment 400 on the first device 105 changes. For example, the viewpoint used for the CGR environment may change as the first user 110 walks around the first real world scene 115. As the first user 110 walks around, additional camera images of the first real world scene 115 are captured and used to provide an updated view of the CGR environment 400. During such movements and corresponding changes in viewpoint, the positional relationship between the depiction of the couch 445 and end tables 420a, 420b can be maintained. In the example of FIG. 5, the depiction of the couch 445 would remain between the depictions of the end tables 420a, 420b as the viewpoint changes, e.g., regardless of whether the user is looking at it from the left side or the right side of the first real world scene 115.

Examples of 3D content corresponding to data objects include, but are not limited to, a table, a floor, a wall, a desk, a book, a body of water, a mountain, a field, a vehicle, a counter, a human face, a human hand, human hair, another human body part, an entire human body, an animal or other living organism, clothing, a sheet of paper, a magazine, a book, a vehicle, a machine or other man-made object, and any other 3D item or group of items that can be identified and represented. 3D content can additionally or alternatively include created content that may or may not correspond to real world content including, but not limited to, aliens, wizards, spaceships, unicorns, and computer-generated graphics and models.

Figure 6:
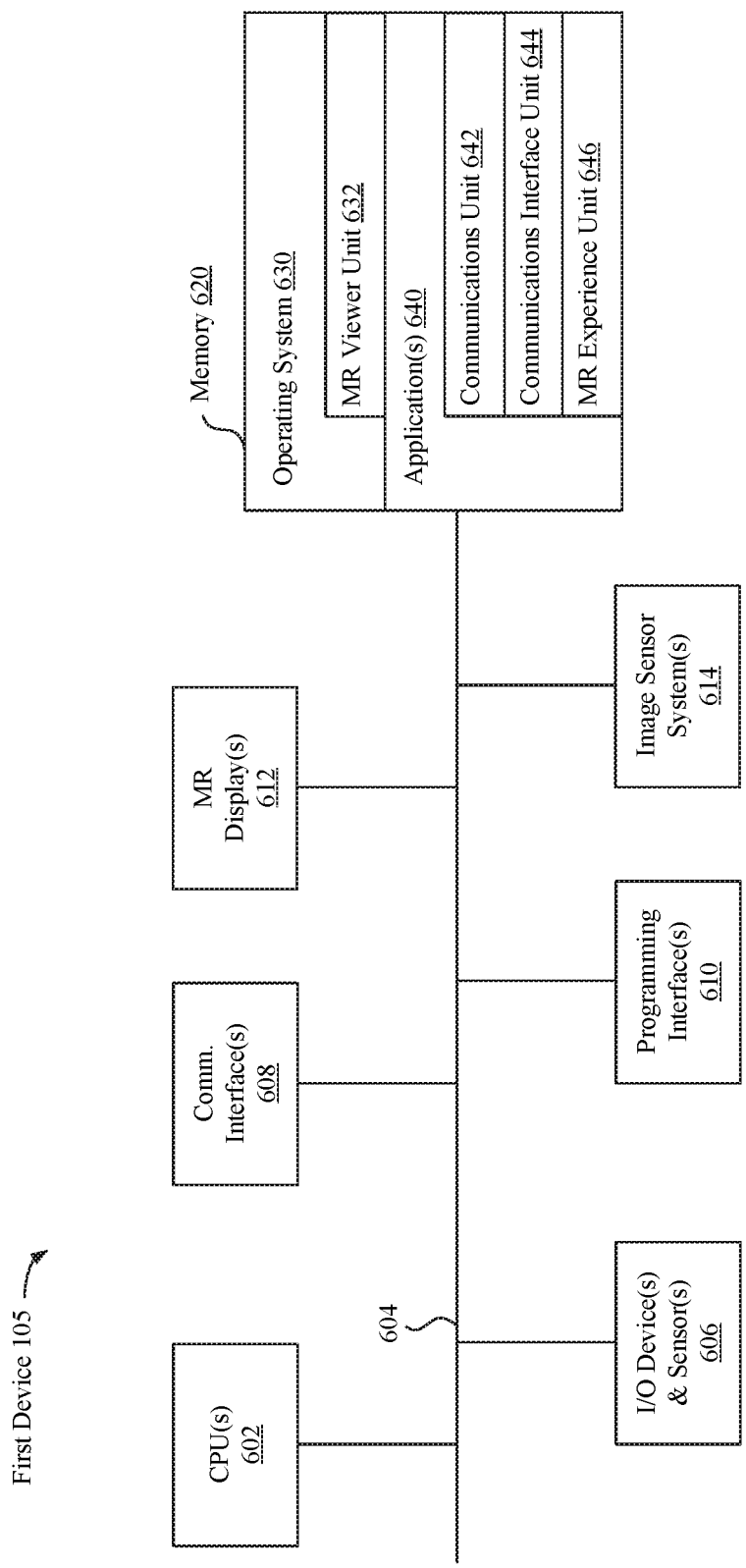
FIG. 6 is a block diagram illustrating device components of an exemplary device according to some implementations.

FIG. 6 is a block diagram illustrating device components of first device 105 according to some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the first device 105 includes one or more processing units 602 (e.g., microprocessors, ASICs, FPGAs, GPUs, CPUs, processing cores, or the like), one or more input/output (I/O) devices and sensors 606, one or more communication interfaces 608 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, SPI, I2C, or the like type interface), one or more programming (e.g., I/O) interfaces 610, one or more displays 612, one or more interior or exterior facing image sensor systems 614, a memory 620, and one or more communication buses 604 for interconnecting these and various other components.

In some implementations, the one or more communication buses 604 include circuitry that interconnects and controls communications between system components. In some implementations, the one or more I/O devices and sensors 606 include at least one of a touch screen, a softkey, a keyboard, a virtual keyboard, a button, a knob, a joystick, a switch, a dial, an inertial measurement unit (IMU), an accelerometer, a magnetometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, one or more depth sensors (e.g., a structured light, a time-of-flight, or the like), or the like. In some implementations, movement, rotation, or position of the first device 105 detected by the one or more I/O devices and sensors 606 provides input to the first device 105.

In some implementations, the one or more displays 612 are configured to present the CGR environment. In some implementations, the one or more displays 612 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electromechanical system (MEMS), or the like display types. In some implementations, the one or more displays 612 correspond to diffractive, reflective, polarized, holographic, etc. waveguide displays. In one example, the first device 105 includes a single display. In another example, the first device 105 includes a display for each eye. In some implementations, the one or more displays 612 are capable of presenting CGR content.

In some implementations, the one or more image sensor systems 614 are configured to obtain image data that corresponds to at least a portion of a scene local to the first device 105. The one or more image sensor systems 614 can include one or more RGB cameras (e.g., with a complimentary metal-oxide-semiconductor (CMOS) image sensor or a charge-coupled device (CCD) image sensor), monochrome camera, IR camera, event-based camera, or the like. In various implementations, the one or more image sensor systems 614 further include illumination sources that emit light, such as a flash.

The memory 620 includes high-speed random-access memory, such as DRAM, SRAM, DDR RAM, or other random-access solid-state memory devices. In some implementations, the memory 620 includes non-volatile memory, such as one or more magnetic disk storage devices, optical disk storage devices, flash memory devices, or other non-volatile solid-state storage devices. The memory 620 optionally includes one or more storage devices remotely located from the one or more processing units 602. The memory 620 comprises a non-transitory computer readable storage medium. In some implementations, the memory 620 or the non-transitory computer readable storage medium of the memory 620 stores the following programs, modules and data structures, or a subset thereof including an optional operating system 630 and one or more applications 640.

The operating system 630 includes procedures for handling various basic system services and for performing hardware dependent tasks. In some implementations, the operating system 630 includes an CGR viewer unit 632 that is configured to be called from the one or more applications 640 to display a CGR environment within a user interface provided by each of the one or more applications 640.

In some implementations, each of the one or more applications 640 is configured to provide a user interface that allows the user to send and receive communications and to display 3D content corresponding to a data object included in or accessed via a received communication. To that end, in various implementations, the one or more applications 640 each includes a communications unit 642, a communications user interface unit 644, and a CGR experience unit 646. In some implementations, the communications unit 642 is configured to send and receive communications including but not limited to SMS messages, MMS messages, text messages, e-mails, social media messages, and the like. In some implementations, the communications interface unit is configured to provide the user interface for displaying received communications or composing and sending communications to other devices, other accounts, and other users. In some implementations, the CGR experience unit 646 is configured to provide a CGR experience. For example, the CGR experience unit 646 may display 3D content corresponding to a received data object in the communications user interface. In some implementations, the CGR experience unit 646 includes a plugin that launches the CGR viewer unit 632 to display 3D content corresponding to a received data object within the communications user interface.

In some implementations, the first device 105 is a head-mounted device. Such a head-mounted device can include a housing (or enclosure) that houses various components of the head-mounted device. The housing can include (or be coupled to) an eye pad disposed at a proximal (to the user) end of the housing. In some implementations, the eye pad is a plastic or rubber piece that comfortably and snugly keeps the head-mounted device in the proper position on the face of the user (e.g., surrounding the eye of the user). The housing can house a display that displays an image, emitting light towards one or both of the eyes of a user.

FIG. 6 is intended more as a functional description of the various features which are present in a particular implementation as opposed to a structural schematic of the implementations described herein. As recognized by those of ordinary skill in the art, items shown separately could be combined and some items could be separated. For example, some functional modules shown separately in FIG. 6 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, or firmware chosen for a particular implementation.

Figure 7:
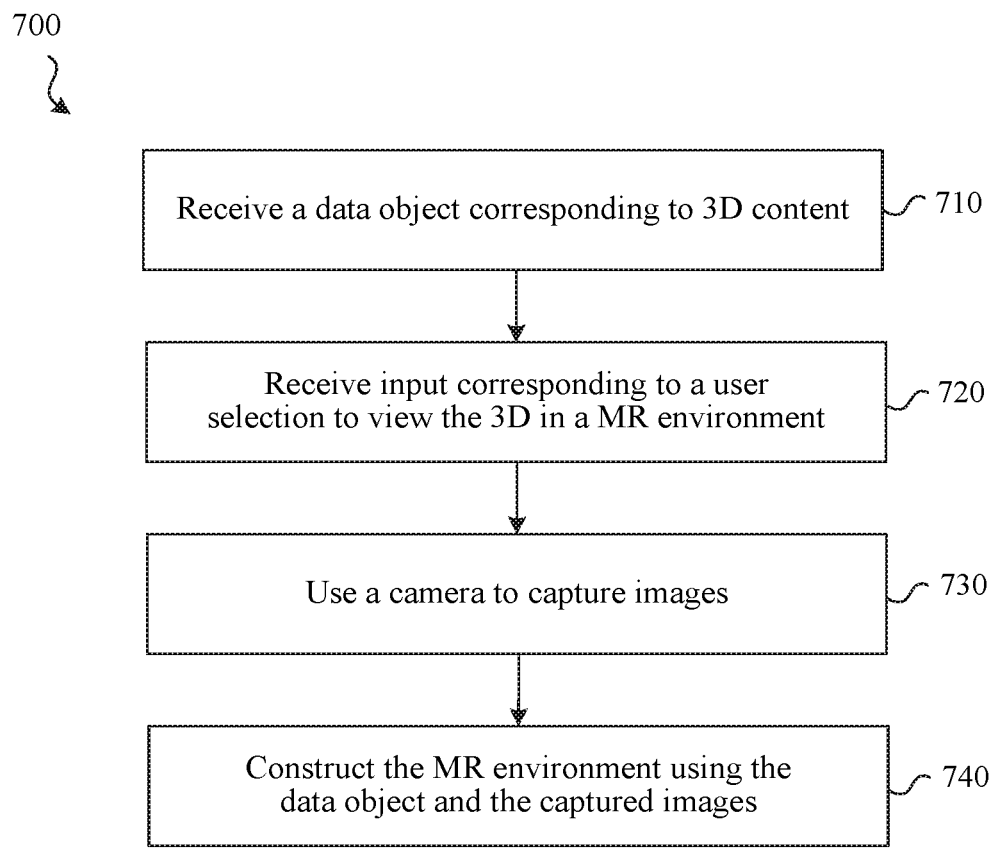
FIG. 7 is a flowchart representation of a method for displaying a CGR environment using 3D content shared from another device in accordance with some implementations.

FIG. 7 is a flowchart representation of a method 700 for displaying a CGR environment using 3D content shared from another device in accordance with some implementations. In some implementations, the method 700 is performed by a device (e.g., first device 105 of FIGS. 1-6). The method 700 can be performed at a mobile device, desktop, laptop, or server device. The method 700 can be performed on a head-mounted device that has a screen for displaying 2D images or a screen for viewing stereoscopic images. In some implementations, the method 700 is performed by processing logic, including hardware, firmware, software, or a combination thereof. In some implementations, the method 700 is performed by a processor executing code stored in a non-transitory computer-readable medium (e.g., a memory).

At block 710, the method 700 receives a data object corresponding to 3D content. The data object is received from a separate device such as from a device used by another user to send the data object or from a server device from which the data object is retrieved. In some implementations, the data object is received in a text message. In some implementations, the data object is received in an e-mail message that attaches the data object. In some implementations, the data object is received based on user input. For example, the device may receive a message that has a link (e.g., a text message, e-mail message, or social media message having the link), receive input accessing the link (e.g., touching or clicking on the link), and responsive to detecting the input, access the link to download the data object.

At block 720, the method 700 receives input corresponding to a user selection to view the 3D content in a CGR environment. In some implementations, the method 700 presents an icon, a graphic, or text representing 3D content corresponding to the data object on a user interface that is used for communications (e.g., sending/receiving messages, e-mails, and other communications) and receives input corresponds to a user selection of the icon, the graphic, or the text. In some implementations, a user interface displays an icon, graphic, or text representing such received 3D content and also displays an indicator (text, graphic, etc.) that indicates that a selection of the icon, graphic, or text will launch a viewer for viewing the received 3D content in a CGR viewing mode.

Blocks 730 and 740 are performed responsive to detecting the input to display a CGR environment at the device. At block 730, the method 700 uses a camera to capture images. The images captured by the camera depict real world content at the scene of the device that can be included in the CGR environment.

At block 740, the method 700 constructs the CGR environment using the data object and the captured images. In some implementations, constructing the CGR environment is performed by overlaying the 3D content on the captured images. In some implementations, constructing the CGR environment is performed by detecting one or more planar surfaces in the real world content depicted in the images and positioning the 3D content corresponding to the received data object in the CGR environment based on the detected planar surfaces. For example, at a first instant in time, an image of the received 3D content may be positioned over the most recently captured image of the captured images, at a second instant in time after the capture of an additional captured image, an image (the same or different) of the received 3D content may be positioned over the new recently captured image, etc. In some implementations, constructing the CGR environment is performed by constructing a 3D model corresponding to some or all of the real world content depicted in the images and adding the 3D content corresponding to the received data object to the model and then creating an image of the combined content from a particular viewpoint.

Once the CGR environment is displayed, the method 700 can involve changing the CGR environment based on user input. In some implementations, this involves receiving input to change position or rotation of the 3D content and, responsive to the input, changing the position or the rotation of the 3D content in the CGR environment. For example, the user may move a depiction of a couch to another location in the scene.

In some implementations, the change involves a change of viewpoint. For example, this can involve receiving a movement or rotation of the device and updating the displaying of the CGR environment based on the movement. As the user moves his/her head, moves around the room, jumps up and down, etc., the viewpoint changes. However, the position and rotation of the 3D content relative to real world objects depicted in the CGR environment remain constant. The couch remains in its position relative to the floor and other real world objects depicted in the scene. To maintain constant relative positioning planar surfaces or features are identified in the images and used to maintain the relative position of the received 3D content.

Figure 8:
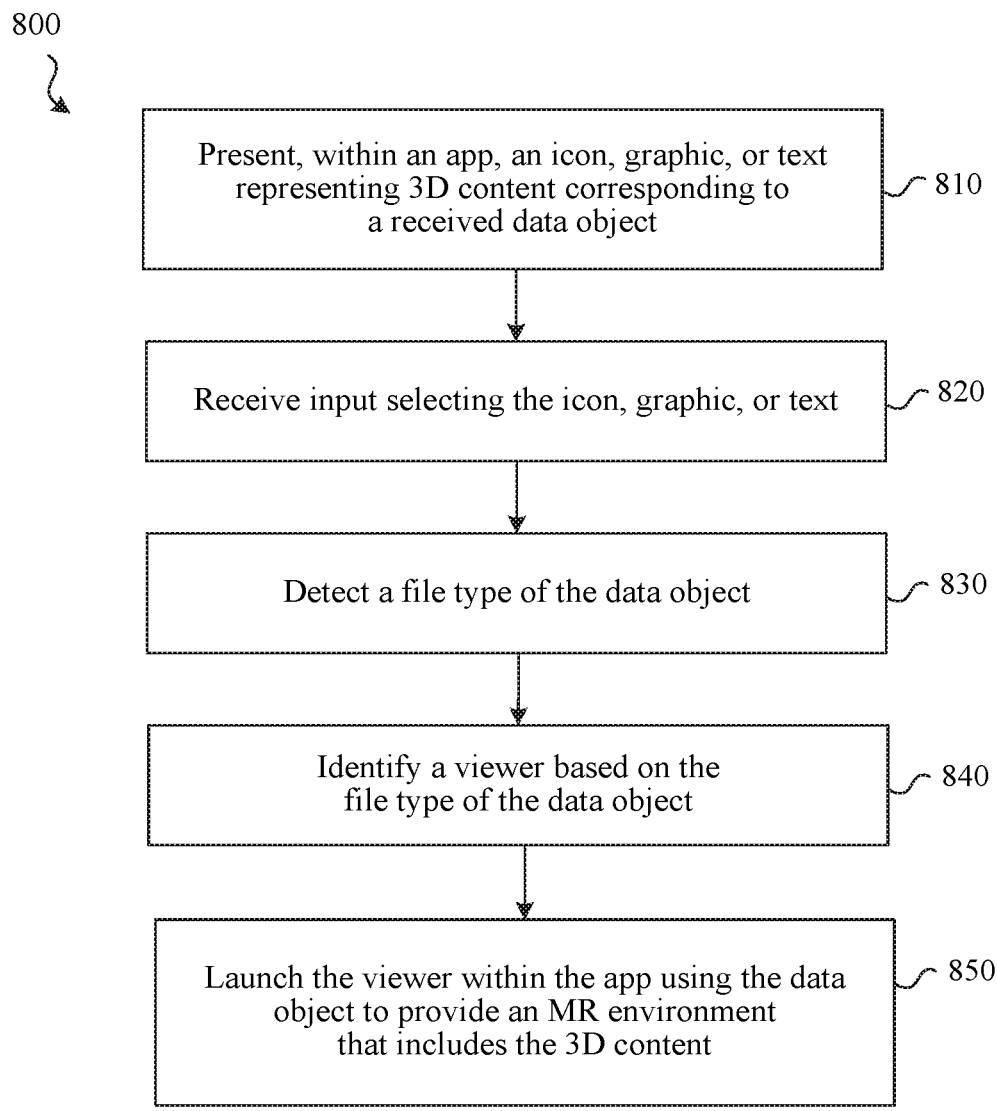
FIG. 8 is a flowchart representation of a method for displaying a CGR environment with received 3D content by launching a viewer from within an application in accordance with some implementations.

FIG. 8 is a flowchart representation of a method 800 for displaying an CGR environment with received 3D content by launching a viewer from within an application in accordance with some implementations. In some implementations, the method 800 is performed by a device (e.g., first device 105 of FIGS. 1-6). The method 800 can be performed at a mobile device, desktop, laptop, or server device. The method 800 can be performed on a head-mounted device that has a screen for displaying 2D images or a screen for viewing stereoscopic images. In some implementations, the method 800 is performed by processing logic, including hardware, firmware, software, or a combination thereof. In some implementations, the method 800 is performed by a processor executing code stored in a non-transitory computer-readable medium (e.g., a memory).

At block 810, the method 800 presents, within an app, an icon graphic or text representing 3D content corresponding to a received data object. At block 820, the method 800 receives input selecting the icon, graphic or text. Responsive to detecting the input, the method 800 provides a CGR environment via a technique depicted in blocks 830, 840, 850.

At block 830, the method 800 detects the file type of the data object. In some implementations, the file type is detected based on an extension of a file of the data object (e.g., .AC, .max, 0.3ds, 0.3dm, 0.3dmf, .dwg, .blend, .cob, .dae, 0.3dxml, .off, .x, .dxf, .x3d, .fmz, etc.). In some implementations, the file type is detected by inspecting the content of the data object.

At block 840, the method 800 identifies a viewer based on the file type of the data object. In some implementations, the viewer is identified using a table that associates viewer applications with different respective file types or file extensions. For example, based on identifying that couch.AC has the file extension ".AC", the method 800 can look up in a table on the device to identify that files having that extension require using a particular viewer. A plugin of the app may include functionality access such a table or otherwise identify the viewer based on the file type. In such instances, the plugin is a subset of code of the app that is added during development of the app to enable display of CGR environments within the app.

At block 850, the method 800 launches the viewer within the app using the data object to provide an CGR environment that includes the 3D content. In some implementations, a plugin added to the app accesses a CGR viewer unit (e.g., CGR viewer unit 632 of FIG. 6) that is part of an operating system on the device or that is otherwise process isolated from the app. In response, the CGR viewer unit launches executable code that provides a viewing/using interface for viewing or using an CGR environment within the user interface of the app. For example, the user interface of the app may display a popup window that presents the CGR environment and UI controls for controlling the viewing or use of the CGR environment. In some implementations, an app that provides a user interface for communications (e.g., sending/receiving messages and other communications) displays an embedded viewer interface provided by a separate, operating-system level CGR viewer unit. In some implementations, such a single CGR viewer unit is accessed and used by multiple, different applications on the device, for example, with in a text messaging app, an e-mail app, an web-browsing app, a social media app, a game, etc. to view 3D content having a one or more particular types (e.g., all data objects having files with extension .AC or .max, etc.).

Figure 9:
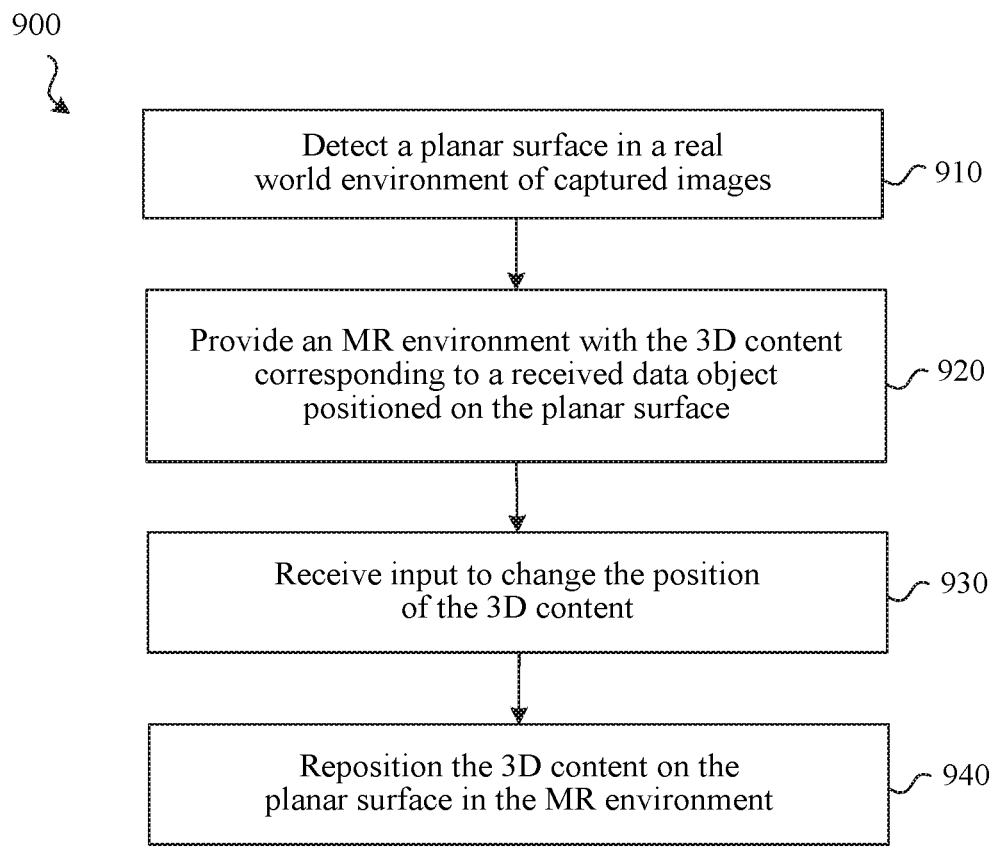
FIG. 9 is a flowchart representation of a method for displaying a CGR environment with received 3D content based on planar surface detection in accordance with some implementations.

FIG. 9 is a flowchart representation of a method 900 for displaying an CGR environment with received 3D content based on planar surface detection in accordance with some implementations. In some implementations, the method 900 is performed by a device (e.g., first device 105 of FIGS. 1-6). The method 900 can be performed at a mobile device, desktop, laptop, or server device. The method 900 can be performed on a head-mounted device that has a screen for displaying 2D images or a screen for viewing stereoscopic images. In some implementations, the method 900 is performed by processing logic, including hardware, firmware, software, or a combination thereof. In some implementa-tions, the method 900 is performed by a processor executing code stored in a non-transitory computer-readable medium (e.g., a memory).

At block 910, the method 900 detects a planar surface in a real world environment of captured images. In some implementations, this involves using a surface detection algorithm or neural network/machine learning procedure to analyze the color of pixels of the captured images to identify the surfaces. Detecting a planar surface can involve identifying feature points and corresponding planar surfaces in each of multiple images/frames of captured video images/frames. Detecting planar surfaces can additionally or alternatively involve the use of received IR or other sensor data identifying the distances corresponding to different portions of the captured images. For example, the captured images can be RGB-D images that combine RGB images from an RGB camera and depth images from a depth sensor.

At block 920, the method 900 provides an CGR environment with 3D content corresponding to a received data object positioned on the planar surface. In some implementations, a planar surface is identified and the 3D content is positioned with a surface of the 3D content adjacent to the planar surface. For example, if a planar surface corresponding to a floor is detected, a couch may be positioned with its bottom surface adjacent or otherwise aligned with (e.g., parallel to, etc.) that planar surface. If the couch, table, or other depiction of a 3D object has legs, feet, wheels, or other supporting structures extending from its bottom, the bottoms of those components may be identified and positioned on the planar surface.

At block 930, the method 900 receives input to change the position of the 3D content. In some implementations, the 3D content is depicted as moving while it is dragged via mouse-based or touch-based input. At block 940, the method 900 repositions the 3D content on the planar surface in the CGR environment. In some implementations, the 3D content is depicted as moving while it is dragged during the input and then automatically moved to be adjacent to the 3D surface following the drag input. For example, a couch may be dragged in the air above a planar surface corresponding to a floor and then automatically moved to be adjacent to or otherwise aligned with the floor at the conclusion of the drag input.

Figure 10:
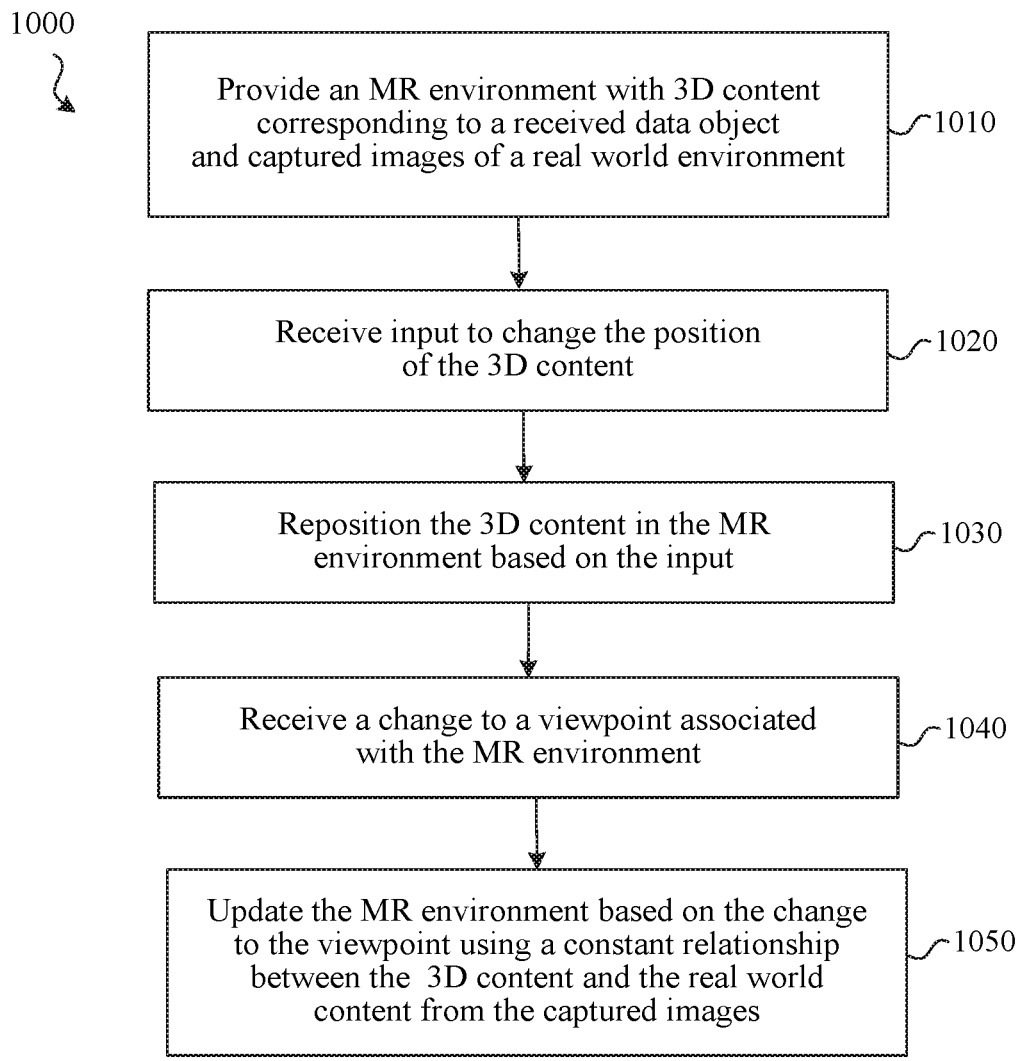
FIG. 10 is a flowchart representation of a method for displaying a CGR environment with received 3D content based on viewpoint changes in accordance with some implementations.

FIG. 10 is a flowchart representation of a method 1000 for displaying an CGR environment with received 3D content based on viewpoint changes in accordance with some implementations. In some implementations, the method 1000 is performed by a device (e.g., first device 105 of FIGS. 1-6). The method 1000 can be performed at a mobile device, desktop, laptop, or server device. The method 1000 can be performed on a head-mounted device that has a screen for displaying 2D images or a screen for viewing stereoscopic images. In some implementations, the method 1000 is performed by processing logic, including hardware, firmware, software, or a combination thereof. In some implementations, the method 1000 is performed by a processor executing code stored in a non-transitory computer-readable medium (e.g., a memory).

At block 1010, the method 1000 provides an CGR environment with 3D content corresponding to a received data object and captured images of a real world environment. At block 1020, the method 1000 receives input to change the position of the 3D content and, at block 1030, the method 1000 repositions the 3D content in the CGR environment based on the input. For example, in response to input, the method may reposition a depiction of a couch (3D object) between two end tables in a depiction of the real world scene.

At block 1040, the method 1000 receives a change to a viewpoint associated with the CGR environment. In some implementations, the input to change the viewpoint is a rotation or translation of the device in the real world scene. At block 1050, the method 1000 updates the CGR environment based on the change to the viewpoint using a constant relationship between the 3D content and real world content (e.g., real world objects, surfaces, features, etc.) from the captured images.

In some implementations, a device used to display an CGR environment having 3D content corresponding to a received data object is further configured to switch between a mixed reality (MR) viewing mode and a virtual reality (VR) viewing mode. For example, a user viewing the CGR environment 400 of FIG. 5 may switch to a VR viewing mode in which only the couch is displayed, i.e., the real world content is not included. In some implementations, this involves receiving input to switch to a VR viewing mode and, responsive to detecting the input, discontinuing display of an MR environment at the device and initiating a VR display of the 3D content without the real world scene. In some implementations, the capturing of images of the real world scene by the camera is discontinued. However, in some implementations, the device continues to capture images of the real world scene by the camera while in VR viewing mode. By doing so, the device is enable to switch back to the MR viewing mode more quickly. For example, to enable quicker switch from VR viewing mode to MR viewing mode, the system is configured to continue plane detection in the background using the one or more images while in VR viewing mode. Note that use of an operating system level CGR viewer may provide better control over the camera of the device and thus enable the use of the camera in VR viewing mode to facilitate the continued image capture and plane detection that enables faster mode transitioning.

In some implementations, a viewer is configured to toggle between VR viewing mode and MR viewing mode and to provide different features in each of the different viewing modes. In some implementations, a viewer is configured with VR mode functionality that enables 3D content to be rotated and zoomed to easily view different sides and characteristics of the 3D content and with AR functionality that positions the 3D content adjacent to or aligned with a real world 3D surface and that maintains the 3D content in a constant position/rotation relative to the real world scene.

In some implementations, a viewer is configured to transition between VR viewing mode and MR viewing mode and vice versa by moving 3D content from one coordinate system into another coordinate system. In some implementations, the viewer is configured to make the viewing mode transition appear smooth and non-jarring so that the 3D content does not appear to jerk to a new position during the transition. In some implementations, the 3D content is positioned on a planar surface at a position that reduces the amount of apparent movement of the object. In some implementations this involves shooting a ray through the screen (perpendicular to the plane of the screen) to the base of the 3D content (e.g., a line corresponding the user's line of sight) to identify a position in the real world scene for the 3D content. This minimizes the apparent translation of the 3D content to the user. In some implementations, the transition involves creating an animation path along the ray that provides a smooth transition. The 3D content is moved over time along such an animation path rather than all at once to avoid a jerky appearance.

Numerous specific details are set forth herein to provide a thorough understanding of the claimed subject matter. However, those skilled in the art will understand that the claimed subject matter may be practiced without these specific details. In other instances, methods apparatuses, or systems that would be known by one of ordinary skill have not been described in detail so as not to obscure claimed subject matter.

Unless specifically stated otherwise, it is appreciated that throughout this specification discussions utilizing the terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more implementations of the present subject matter. Any suitable programming, scripting, or other type of language or combinations of languages may be used to implement the teachings contained herein in software to be used in programming or configuring a computing device.

Implementations of the methods disclosed herein may be performed in the operation of such computing devices. The order of the blocks presented in the examples above can be varied for example, blocks can be re-ordered, combined, or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. A method comprising:
   at a device with one or more processors, a camera, and a computer-readable storage medium:
   receiving, at the device, a message comprising a data object comprising a three dimensional (3D) model of 3D content, wherein the message is received from a separate device;
   presenting an icon, a graphic, or text representing the 3D content corresponding to the data object on a user interface that is used for viewing and responding to messages;
   receiving, at the device, input corresponding to a user selection to view the 3D content in a computer generated reality (CGR) environment, wherein the input is received on the user interface that is used for viewing and responding to messages;
   responsive to detecting the input, displaying a CGR environment at the device, wherein displaying the CGR environment comprises:
   using the camera to capture images; and
   constructing the CGR environment using the data object and the captured images, wherein the 3D content is positioned at an identified position within the CGR environment; and
   updating the displaying of the CGR environment based on a movement of the device, wherein the position and rotation of the 3D content relative to the identified position remains constant relative to the CGR environment.

2. The method of claim 1, wherein constructing the CGR environment comprises overlaying the 3D content on the captured images.

3. The method of claim 1 further comprising:
   receiving, at the device, input to change position or rotation of the 3D content;
   responsive to the input to change position or rotation of the 3D content, changing the position or the rotation of the 3D content in the CGR environment.

4. The method of claim 1 further comprising:
   receiving, at the device, a movement of the device; and
   updating the displaying of the CGR environment based on the movement, wherein position and rotation of the 3D content relative to real world objects in the CGR environment remains constant.

5. The method of claim 1, wherein displaying the CGR environment further comprises:
   identifying a planar surface in a real world environment based on the captured images; and
   positioning the 3D content on the planar surface.

6. The method of claim 5 further comprising:
   receiving, at the device, a movement of the device; and
   updating the displaying of the CGR environment based on the movement, wherein the position and rotation of the 3D content relative to the planar surface remains constant.

7. The method of claim 1, wherein receiving the message comprises receiving a text message comprising the data object.

8. The method of claim 1, wherein receiving the message comprises receiving an e-mail message attaching the data object.

9. The method of claim 1, wherein receiving the message comprises:
   receiving the message comprising a link;
   receiving input accessing the link; and
   responsive to detecting the input accessing the link, downloading the data object.

10. The method of claim 1, wherein the input corresponding to the user selection selects the icon, the graphic, or the text.

11. The method of claim 1 further comprising, responsive to detecting the input:
    detecting a file type of the data object;
    identifying a viewer based on the file type; and
    launching the viewer to provide the CGR environment.

12. The method of claim 11, wherein the data object is received by an app on the device, wherein the app:
    receives the selection to view the 3D content in the CGR environment; and
    accesses a plugin to launch a viewer to provide the CGR environment with the 3D content within the app.

13. The method of claim 1 further comprising, responsive to detecting the input, accessing a plugin that launches a viewer to provide the CGR environment with the 3D content, wherein the viewer is provided within an app that provides the user interface that is used for communications.

14. A system comprising:
    a non-transitory computer-readable storage medium;
    a camera; and
    one or more processors coupled to the non-transitory computer-readable storage medium, wherein the non-transitory computer-readable storage medium comprises program instructions that, when executed on the one or more processors, cause the system to perform operations comprising:
    receiving a message comprising a data object comprising a three dimensional (3D) model of 3D content, wherein the message data object is received from a separate device;

presenting an icon, a graphic, or text representing the 3D content corresponding to the data object on a user interface that is used for viewing and responding to messages;

receiving input selecting the icon, the graphic, or the text, wherein the input is received on the user interface that is used for viewing and responding to messages;

responsive to detecting the input, displaying a computer generated reality (CGR) environment at the device, wherein displaying the CGR environment comprises:

using the camera to capture images; and constructing the CGR environment using the data object and the captured images, wherein the 3D content is positioned at an identified position within the CGR environment; and updating the displaying of the CGR environment based on a movement of the device, wherein the position and rotation of the 3D content relative to the identified position remains constant relative to the CGR environment.

15. The system of claim 14, wherein receiving the message comprises receiving a text message or e-mail comprising the data object.

16. The system of claim 14, wherein receiving the message comprises:

receiving message comprising a link;

receiving input accessing the link; and responsive to detecting the input accessing the link, downloading the data object.

17. The system of claim 14, wherein the operations further comprise, responsive to detecting the input:

detecting a file type of the data object;

identifying a viewer based on the file type; and launching the viewer to provide the CGR environment.

18. The system of claim 17, wherein the data object is received by an app on the device, wherein the app:

receives the selection to view the 3D content in the CGR environment; and accesses a plugin to launch a viewer to provide the CGR environment with the 3D content within the app.

19. A non-transitory computer-readable storage medium, storing program instructions computer-executable on a computer to perform operations comprising:

receiving a message comprising a data object comprising a three dimensional (3D) model of 3D content or a link to the data object, wherein the message is received from a separate device;

displaying the message in an app, wherein the message comprises an icon, a graphic, or text representing the 3D content corresponding to the data object, the message displayed in a user interface that is used for viewing and responding to messages;

receiving input selecting the icon, the graphic, or the text, wherein the input is received on the user interface that is used for viewing and responding to messages;

responsive to detecting the input, displaying a computer generated reality (CGR) environment, wherein displaying the CGR environment comprises:

using the camera to capture images; and constructing the CGR environment using the data object and the captured images, wherein the 3D content is positioned at an identified position within the CGR environment; and updating the displaying of the CGR environment based on a movement of the device, wherein the position and rotation of the 3D content relative to the identified position remains constant relative to the CGR environment.

20. The non-transitory computer-readable storage medium of claim 19, wherein constructing the CGR environment comprises overlaying the 3D content on the captured images.

* * * * *

UNITED STATES PATENT AND TRADEMARK OFFICE
CERTIFICATE OF CORRECTION

Page 1 of 1

PATENT NO. : 10,984,607 B1
APPLICATION NO. : 16/367524
DATED : April 20, 2021
INVENTOR(S) : Norman N. Wang et al.

It is certified that error appears in the above-identified patent and that said Letters Patent is hereby corrected as shown below:

In the Claims

Claim 14, Column 18, Lines 66-67 read:
"wherein the message data object is received from a separate device;"
Should read:
--wherein the message is received from a separate device;--

Signed and Sealed this
Eighteenth Day of May, 2021

Drew Hirshfeld
*Performing the Functions and Duties of the*
*Under Secretary of Commerce for Intellectual Property and*
*Director of the United States Patent and Trademark Office*